(No Model.)

C. A. FAURE.
POLARIZATION BATTERY OR ELECTRIC ACCUMULATOR.

No. 309,838. Patented Dec. 30, 1884.

Witnesses
E. E. Masson
W. B. Masson

Inventor
Camille Alphonse Faure
by A. Pollok
his attorney

UNITED STATES PATENT OFFICE.

CAMILLE A. FAURE, OF PARIS, FRANCE.

POLARIZATION-BATTERY OR ELECTRIC ACCUMULATOR.

SPECIFICATION forming part of Letters Patent No. 309,838, dated December 30, 1884.

Application filed August 10, 1882. (No model.) Patented in France October 20, 1880, No. 139,258.

*To all whom it may concern:*

Be it known that I, CAMILLE ALPHONSE FAURE, of Paris, in the Republic of France, have invented a new and useful Improvement in Polarization-Batteries or Electric Accumulators, (for which I have received a certificate of addition dated October 19, 1881, to my French Patent No. 139,258, dated October 20, 1880,) which improvement is fully set forth in the following specification.

This invention has reference more particularly to electric batteries or accumulators wherein the electrodes or battery-plates consist of conducting-supports with active material applied thereto prior to their immersion in the battery-fluid, as described in Letters Patent No. 252,002, granted to my assignees January 3, 1882.

The invention consists in the special construction of the electrodes or elements of the couples.

In the accompanying drawings the several figures represent electrodes constructed in accordance with the invention.

Figure 1 is a horizontal section of an electrode prepared with active material; Fig. 2, a perspective of the supporting-plate of said electrode; Fig. 3, a vertical section of another prepared plate; Fig. 4, a perspective view, partly in section, of a third form; Fig. 5, a view of a pair of electrodes of a fourth form; and Figs. 6 and 7, a vertical section and a horizontal section, respectively, of other forms.

In all the figures, A is the plate or support of the electrode, and B the active material contained in receptacles, cavities, or interstices *a* in the support, as well as forming a coating on the face thereof. C, Fig. 7, are additional plates, as hereinafter explained.

Referring to Figs. 1 and 2, the supporting-plate A is corrugated vertically—that is to say, the corrugations run up and down, thus leaving on the plate a series of open furrows or grooves, *a*, which form receptacles for the active material (or material to become active) B. The corrugations also stiffen the plate. The active material, as shown in this figure, consists of thin foil, (say lead-foil, although other foil may be used.) This foil is crumpled, and is lightly compressed and packed into the furrows or receptacles *a*. Prior to or after its application the foil is exposed to the action of a corroding agent—for example, sulphuric or other acid of a strength sufficient to attack the metal. It may be immersed in said agent, if a liquid, or may otherwise be exposed to its action. The supporting-plate also may be corroded before or after the application of the foil. If desired, an active layer may be formed on the plate solely by corroding it with strong or weak acid or other suitable agent, and then decomposing the compound by the electric current. Instead of filling the furrows or grooves in the plates with foil, as above described, they may be filled with minium or other oxide of lead, or with a salt, such as sulphate of lead, or with lead filings, or with porous lead obtained by chemical or by galvanic deposit, or with mixtures of lead in these several states, or with mixtures of lead-foil or leaf-lead and lead in one or more of the states mentioned, or with other suitable active material. The active material may be held in place by an open-work perforated or porous medium, as described in the above-mentioned patent, or as in my application for improvement in polarization-batteries or electric accumulators filed of even date herewith, and numbered 68,949, (the present application being numbered 68,950.)

Plates or electrodes made as indicated may be assembled and arranged in any known or suitable way—as, for example, in the various ways described in the patent and application just referred to.

As shown in Fig. 3, the plate is corrugated horizontally; but otherwise the description given in Figs. 1 and 2 will apply thereto.

In Fig. 4 the electrode is formed of wire-cloth woven with rather an open mesh, leaving holes or interstices *a*, which are filled with the active material B. Both faces of the cloth are also coated.

The tag or ear D, to which the exterior conductor is attached, is formed by twisting together several strands of the wire constituting the support of the electrode.

In Fig. 5 the supports of the two electrodes are formed of wires twisted together. The wire ropes are coated with active material by mechanical application, by chemical or galvanic deposit, or by corroding the surface.

They are then wrapped spirally with a band of felt, b, or other porous medium, with or without the interposition of parchment. Strips of gutta-percha or other insulating material may be used outside, if desired. Two electrodes thus constituted are wrapped together, the porous material b or gutta-percha strips keeping the electrodes apart.

Electrodes formed of wire ropes may also be arranged in various other ways—straight, zigzag, or in other suitable forms; and to diminish resistance the exterior conductor may be connected with both ends, or at the ends and also at intermediate points.

Figure 7:
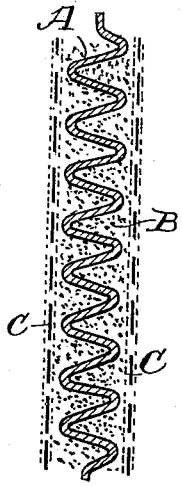
Fig. 7 shows an electrode like that illustrated in Fig. 1, except that a perforated lead plate, C, coated with active material by corrosion or otherwise, is applied on either side of the corrugated plate.

Instead of the perforated plates C in Fig. 7, foil of, say, one-tenth millimeter thickness, or wire-cloth, could be applied with or without previous corrosion with sulphuric acid.

It is obvious that the plates or supports described, or any of them, may be "formed" on the well-known principle of Mr. Gaston Planté.

Felt or similar porous medium, with or without parchment sheets, may be used with the other plates or electrodes shown, indicated, or suggested, as well as with those of which specific mention is made.

Figure 1:
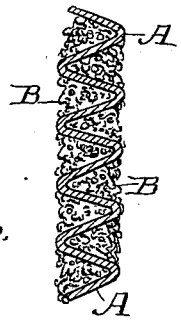
Figure 2:
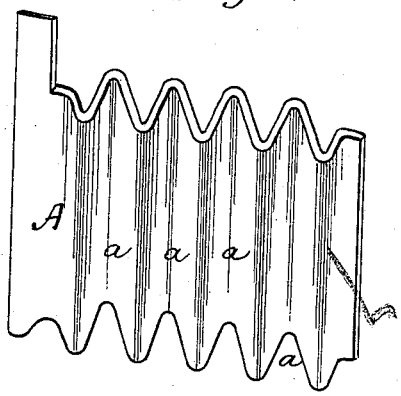
Figure 3:
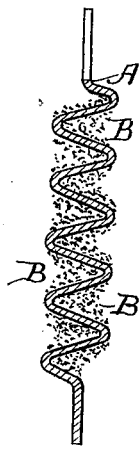
Figure 4:
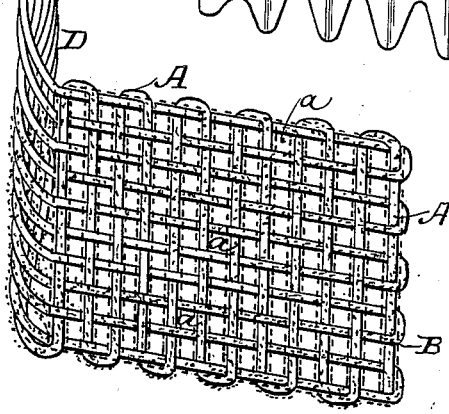
Figure 5:
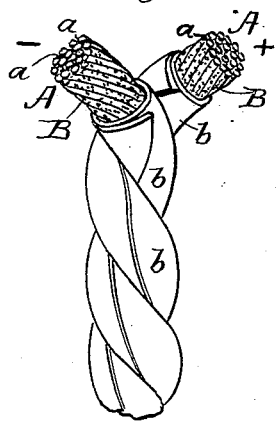
Figure 6:
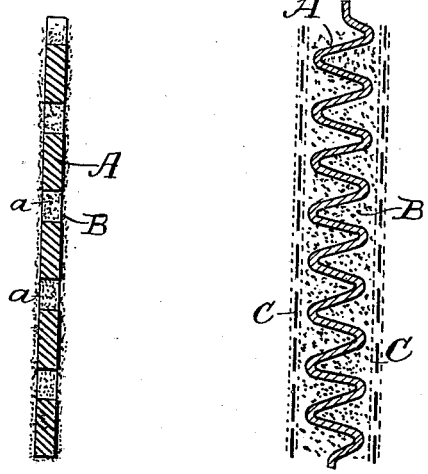
Fig. 6 shows a plate perforated with numerous small holes and coated with active material by any of the means described.

The corrugated-plate electrodes, Figs. 1, 2, and 3, the perforated-plate electrode, Fig. 6, the corrugated and perforated plate electrode, Fig. 7, the woven-wire electrode, Fig. 4, and the wire-rope electrode, Fig. 5, are all of my own invention.

I claim the new improvements herein described, all and several, to wit:

1. In a polarization-battery or electric accumulator, an electrode having a conducting-support provided with receptacles therein, and active material in the form of leaf-lead or foil packed in said receptacles, substantially as described.

2. An electrode comprising a conducting-support combined with active material in the form of pieces of metal—leaf-lead or foil, for example—applied to said conducting-support and corroded on their surfaces prior to immersion in the battery-liquid, substantially as described.

3. An electrode having metal foil, rolled, crumpled, or in other suitable form, applied to a conducting-support, substantially as described.

4. An electrode comprising corroded metal foil, combined with a conducting plate or support, substantially as described.

5. An electrode comprising a conducting-support provided with receptacles extending through the support, so as to open on both sides of said support, active material packed in said receptacles and applied on both faces of the support, and a porous or permeable retaining medium outside of said active material, substantially as described.

6. An electrode comprising a conducting-support provided with receptacles extending through the support, active material in the form of leaf-lead or metal foil corroded, crumpled, and packed in said receptacles, and applied also on the surface of the conducting-support, and a porous retaining medium, substantially as described.

In testimony whereof I have signed this specification in the presence of two subscribing witnesses.

C. A. FAURE.

Witnesses:
A. POLLOK,
ROBT. M. HOOPER.